Figure 1:
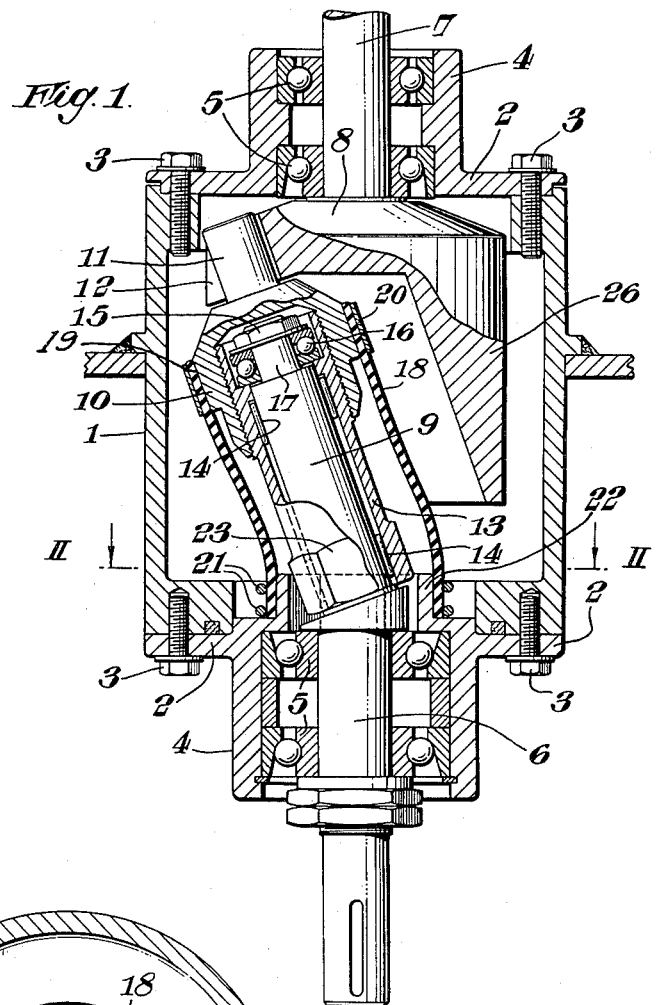

Feb. 12, 1963  R. MUNRO  3,077,117
HERMETICALLY SEALED SHAFT COUPLING
Filed June 19, 1961

INVENTOR
ROBERT MUNRO
By

United States Patent Office 3,077,117
Patented Feb. 12, 1963

3,077,117
HERMETICALLY SEALED SHAFT COUPLING
Robert Munro, Priory Road, Hardway, Gosport, England
Filed June 19, 1961, Ser. No. 117,910
4 Claims. (Cl. 74—18.1)

This invention relates to couplings for connecting two shafts to enable torque to be transmitted therethrough with hermetic sealing therebetween.

A hermetically sealed shaft coupling according to the invention comprises a housing supporting the ends of a pair of driving and driven shafts lying on a common axis, an acutely inclined crank from one shaft which moves around a conical path and has driving connection with the other shaft through a bearing pin co-axial with said crank, an enlargement on the other shaft having means displaced from the said common axis to receive said bearing pin to constitute said driving connection, said bearing pin having a cylindrical head to which one end of a flexible cylindrical sealing envelope surrounding the crank is fixedly attached, the other end of said envelope being fixedly secured to said housing said cylindrical head of the bearing pin having fixedly attached thereto one end of a rigid supporting sleeve within said envelope and surrounding the said inclined crank, the sleeve having a nutational connection with the housing at its other end, said nutational connection allowing the sleeve to follow the said conical path of the crank, the nutational connection being designed to restrain the supporting sleeve from turning on its own axis.

It is essential that the application of torque to the flexible sealing envelope shall be prevented so that it is relieved of substantially all force tending to twist it about its own axis, and the introduction of the rigid supporting sleeve carrying the bearing pin separated from the inclined crank, and itself restrained from turning on its own axis has proved very effective for such a purpose. Neither the rigid sleeve (with the sealing envelope attached) nor the crank itself rotates on its own axis, but in operation there is relative rotation between the crank and the sleeve as both move simultaneously in a conical path, and this relative rotation is taken up by suitable anti-friction bearings between these two members.

A practical form of nutational means may consist of a multi-faced head or equivalent such as one or more flats on the nutational end of the sleeve, said head or equivalent loosely engaging in a correspondingly shaped fixed abutment frame forming part of the housing and enclosing the base end of the crank and co-axial with the crank shaft, the play afforded by the frame allowing for a nutational movement during the throw of the sleeve during its movement in a conical path as the two shafts rotate.

In order that the invention may be readily understood and carried into effect, reference will now be made to the accompanying drawing which illustrates a typical and practical embodiment thereof.

Figure 2:
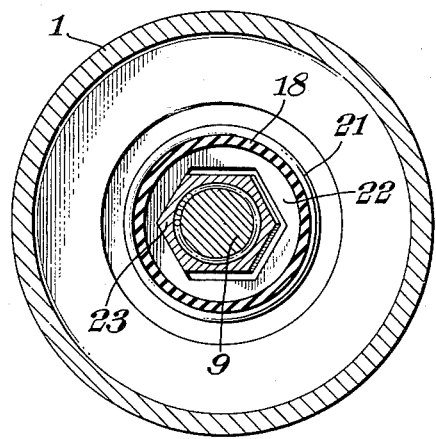

In the drawing:
FIGURE 1 is a longitudinal section through the improved coupling; and
FIGURE 2 is a cross section on line II—II of FIGURE 1.

The coupling shown comprises a housing including a cylinder 1 with end plates 2 which are secured by screws 3, the end plates having co-axial hub portions 4 which house roller bearings 5 supporting the ends of driving and driven shafts 6 and 7 either of which may be the driver.

Within the housing cylinder 1, there is a drive transmitting assembly of which the shaft 7 has a crank disc 8 and the shaft 6 has an acutely inclined crank 9. The coupling between the shafts comprises a non-rotatable oscillatable member 10 having a hollow cylindrical body portion which constitutes the head of a bearing pin 11 projecting co-axially with the inclined crank 9. This bearing pin 11 engages with radial freedom in a bearing hole or slot 12 formed in the crank disc 8. The disc 8 constitutes an enlargement of the shaft and the slot 12 therein provides means displaced from the common axis of the shafts 6 and 7 to receive the bearing pin 11. The body 10 is internally threaded and has screwed therein an axially projecting rigid supporting sleeve 13 which extends the full length of the inclined crank 9 and supports needle bearings 14 which engage the cylindrical surface of the crank 9. The sleeve 13 also supports end thrust roller bearings 16, which are held in position on a reduced end spigot 17 of the crank 9 by a nut and washer assembly 15.

A cylindrical flexible sealing envelope 18 encloses the bearing support sleeve 13, being fixed to a flange 19 of the bearing pin head. The sleeve end is fixed by means of an anchor ring 20. The opposite end of the sealing envelope is sealed by a wire clamp 21 to an external cylindrical boss 22 constituting an abutment frame part of the housing.

When either shaft 6 or 7 is rotated, the acutely inclined crank 9 rolls bodily generating a cone about the common axis of shafts 6 and 7, with its apex at the base end of the crank 9 where it joins the shaft proper 6. The bearing pin head 10 being freely rotatable on the crank 9 and having radial and rotational freedom at the pivot pin 11, does not rotate on its own axis but moves with the gyration of the crank 9 in a conical path around the common shaft axis, and takes with it the sealing envelope 18.

The extended rigid support sleeve 13 is restrained from turning on its own axis by a nutational connection, at its end remote from the bearing pin, with the frame 22 of the housing. It thus restrains any twisting or other distortion strain being placed upon the flexible envelope 18 as the shafts rotate. In the present embodiment the nutational anchor consists of a hexagonal head 23 formed on the shaft end of the sleeve 13 and loosely engaging in a correspondingly shaped recess formed in the abutment frame 22 enclosing the base end of the crank 9, and co-axial with the shaft 7, said frame being formed on the inside of the hub flange 4. The play between the nut 23 and the frame 22 allows for the throw of the sleeve 13 as it moves through its conical path.

It will be appreciated that when the shaft 6 rotates, centrifugal force is developed due to the eccentricity of the transmission assembly elements 10, 11, 12, 16, which force is balanced by a counterweight 26 on the crank disc 8 of the shaft 7, the counterweight being effective due to the radial freedom provided in the eccentric bearing connection 11, 12.

The envelope 18 is a tough reinforced tube of rubber, plastic or the like impervious to the passage of liquids and gases.

The separation of the bearing pin 11 from the crank 9 so that the former virtually carries one end of the sealing tube 18, while having no integral connection with the crank, and housing the crank in a rigid sleeve (13) forming a fixed part of the bearing pin 11, said sleeve 13 being restrained from rotation on its own axis, efficiently protects the sealing tube 18 against any tendency to twist on its own axis.

I claim:
1. A hermetically sealed shaft coupling comprising a housing supporting the ends of a pair of driving and driven shafts lying on a common axis, an acutely inclined crank from one shaft which moves around a conical path and has driving connection with the other shaft through a bearing pin co-axial with said crank, an enlargement on the other shaft having means displaced from the said common axis to receive said bearing pin to constitute said driving connection, said bearing pin having a cylindrical head to which one end of a flexible cylindrical sealing envelope surrounding the crank is fixedly attached, the other end of said envelope being fixedly secured to said housing, said cylindrical head of the bearing pin having fixedly attached thereto one end of a rigid supporting sleeve within said envelope and surrounding the said inclined crank, the sleeve having a nutational connection with the housing at its other end, said nutational connection allowing the sleeve to follow the said conical path of the crank, the nutational connection being designed to restrain the supporting sleeve from turning on its own axis.

2. A shaft coupling according to claim 1 wherein the nutational connection with the housing consists of a multi-faced head on the end of the rigid supporting sleeve remote from the bearing pin, said head loosely engaging in a correspondingly shaped fixed abutment frame enclosing the base end of the crank and co-axial with the crank shaft, the play afforded between the head and the frame allowing for the throw of the sleeve during its movement through a conical path as the two shafts rotate.

3. A shaft coupling according to claim 1 wherein anti-friction bearings are interposed between the rigid supporting sleeve and the crank.

4. A shaft coupling according to claim 1 wherein the bearing pin engages with freedom for radial movement in an enlargement of its associated shaft, said enlargement providing means for counterbalancing the centrifugal forces developed by the assembly.

References Cited in the file of this patent

UNITED STATES PATENTS

| | | |
|---|---|---|
| 1,644,775 | Fulton | Oct. 11, 1927 |
| 1,736,974 | King | Nov. 26, 1929 |
| 2,607,233 | Bosch | Aug. 19, 1952 |
| 2,770,139 | Shen et al. | Nov. 13, 1956 |
| 3,029,648 | Roeser | Apr. 17, 1962 |
| 3,051,008 | Hamren | Aug. 28, 1962 |